Patented Sept. 18, 1934

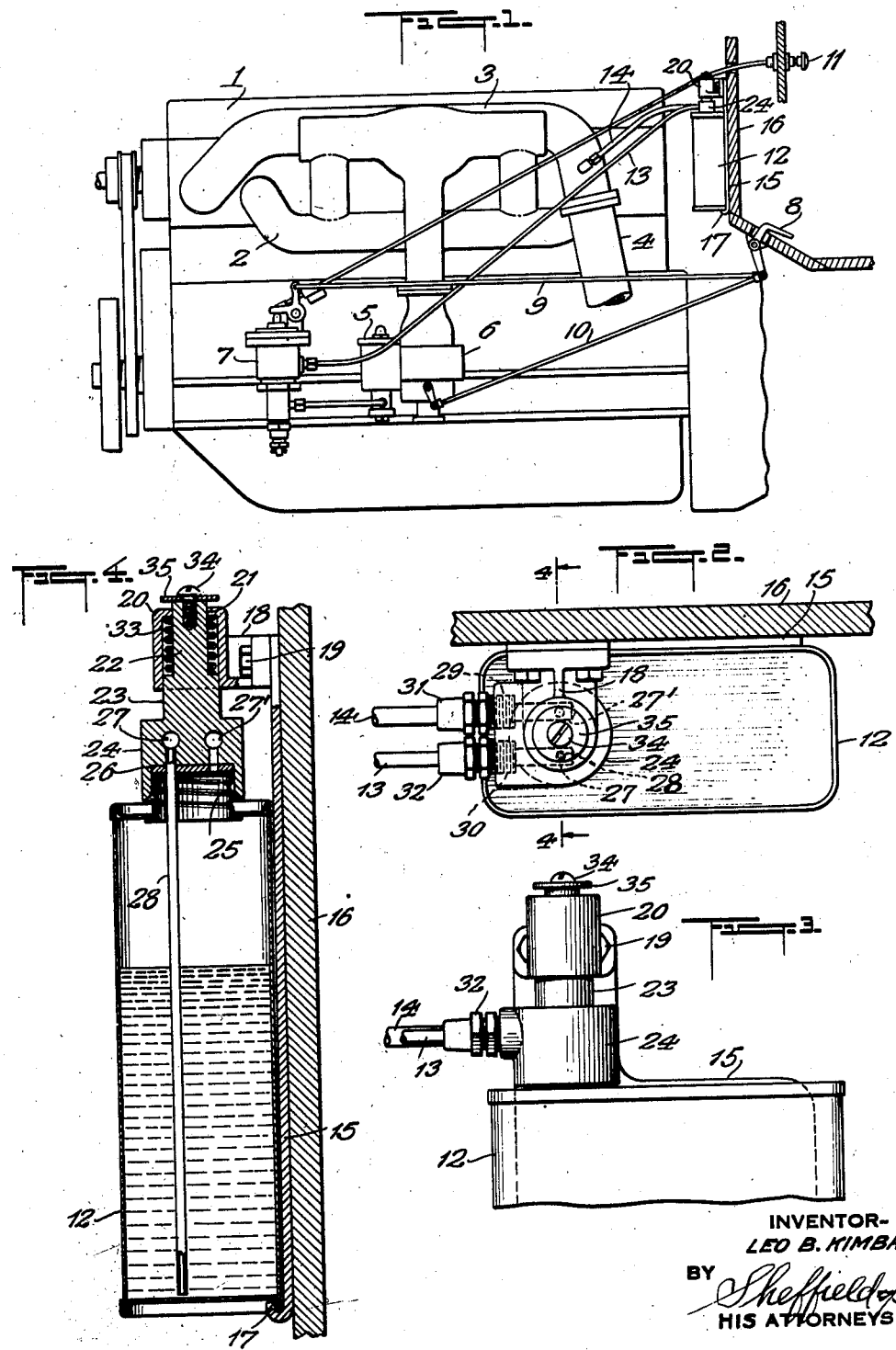

1,974,073

UNITED STATES PATENT OFFICE 1,974,073

RESERVOIR FOR THE SUPPLY OF LIQUIDS

Leo B. Kimball, New Haven, Conn., assignor to Fuel Development Corporation, a corporation of Delaware Application December 12, 1932, Serial No. 646,836

3 Claims. (Cl. 221—74)

This invention relates to reservoirs or tanks which may be used to supply liquids, such as anti-knock liquids, in connection with apparatus such as is described and claimed in my prior application Serial No. 589,430, filed January 28, 1932, for Valves for the fractional supply of fluids.

This invention is particularly applicable to the supply of liquids to the intake conduits or other apparatus which may control the quantity and condition of the fuel used for driving internal combustion automobile engines or engines of a similar nature, as set forth in my said prior application.

One of the main objects of the present invention is to provide a reservoir or tank for the additional liquid so that the same may be very easily and quickly placed in position or removed, and also one that does not require the pouring of the liquid from the container in which it is received to the tank or reservoir carried upon an automobile or on any other similar device.

Briefly stated, my invention comprises apparatus whereby the commercial container in which the liquid is received may have the stopper removed therefrom and then applied immediately to the supports on which it is carried for the purposes above referred to, and thereby serve as a reservoir or tank without other change.

For a description of one form of my invention which I at present deem preferable, reference may be had to the following specification and to the accompanying drawing forming a part thereof, in which Fig. 1 is a side elevation of an automobile engine and connecting parts showing my improved reservoir associated therewith;

Fig. 2 is a plan view of the reservoir as shown in Fig. 1;

Fig. 3 is a front elevation of the top of the reservoir, also shown in Fig. 1; and Fig. 4 is a vertical sectional view taken substantially on the line 4—4 of Fig. 2.

Referring to the drawing, the numeral 1 indicates the top of any common form of automobile or similar engine which is provided with the intake manifold 2, exhaust manifold 3, and the exhaust pipe 4.

The numeral 5 indicates the usual carburetor which is connected with a suitable form of throttle valve 6. The numeral 7 indicates a valve similar to and for the purposes of those described in my prior pending application above mentioned. The accelerator pedal is indicated by the numeral 8, this being connected with the valve 7 by means of the rod 9. The accelerator pedal 8 is also connected with the throttle valve 6 by means of the rod 10. The numeral 11 indicates the hand control knob for determining the range of action of the valve 7. The numeral 12 indicates the reservoir which is the subject matter of the present application. This is connected, as in my prior application, with the valve 7 through a pipe 13 and with the exhaust passages of the engine by the pipe 14.

The manner in which the tank 12 is connected with the pipes 13 and 14 will now be described.

Referring to Figs. 3 and 4, it will be seen that there is a plate 15 which is attached to the dashboard 16 of an automobile or to any other suitable support in any well known and preferred way. The plate 15 has at the bottom an upturned flange 17 which provides a groove within which the lower projecting margin of the reservoir or can 12 may be seated, as shown in Fig. 4. From the upper part of the plate 15 there projects a bracket 18 which is secured to a plate in any suitable way, such as by the screw 19. The bracket 18 supports a hollow cap 20, said cap having an open lower end and an aperture 21 at its upper end. Projecting through this cap is a stud 22, which is expanded adjacent its lower end, as at 23, to fit slidably within the cap 20. The lower end of said portion 23 is still more expanded as at 24 to form a main member connected with the pipes 13 and 14. The enlarged member 24 is provided with a recess within its lower end of sufficient diameter to fit over the outlet tube or flange 25 forming a part of the commercial container or can in which the liquid is received and ordinarily, in transportation, is closed by a suitable screw-threaded cap or other usual device. The recess which receives the tubular portion 25 is preferably provided with a washer 26 of resilient material which will make a liquid-tight contact with the end of the tube 25. Said washer is also provided with suitable openings through which the liquid may pass. The enlarged member 24 of the connecting device is provided with two transverse passages 27 and 27', the former of which connects with the tube 28 passing to a point adjacent the bottom of the can 12. The passage 27 connects, through the washer 26, with the space in the can 12 above the liquid contained therein. The passages 27' and 27 enter screw-threaded openings 29 and 30, which are adapted to receive the screw-threaded ends of nipples or suitable connectors 31 and 32, which connect the pipes 14 and 13 respectively with the expanded portion of the main member 24. Within the cap 20 and surrounding the stud 22 is a compression spring 33 which bears against the top 21 of the cap 20 and tends to force the expanded portion 23 downward. The top of the stud 22 has a screw-threaded hole therein which receives the screw 34, and when in place holds the washer 35 in position to form a stop to prevent the stud 22 and expanded portions 23 and 24 from moving downwardly further than is desired.

It will, of course, be appreciated that the pipes 13 and 14 are small brass or copper pipes which are quite resilient. This permits a slight upward and downward motion of the connecting part 24. In the use of my improved connecting device it will be apparent that the can 12 may be placed in position or removed by simply raising said member 24 until the same is engaged or disengaged from the spout or tube 25 of the can, after which the can may be moved toward or away from the plate 15 at its upper end, while its lower end disengages the lip 17. Otherwise, when the spout 17 engages the member 24, the lower end of the can 12 may be placed upon or removed from the lip 17, by moving the can upward.

It will now be appreciated that the above construction permits the usual container in which the anti-knock or other liquid is purchased, to be utilized as a reservoir or tank for supplying the liquid to the valve or other device without the necessity of pouring liquid from a commercial can into a fixed reservoir. At the same time all the parts are held rigidly in position and are not subject to displacement by vibrations or other motions which may be incident to the operation of a power or other device, such as an automobile engine.

Having thus described this form of my invention, it will be obvious that various changes may be made by those skilled in the art without departing from the main principles and advantages incident to the use thereof.

What I claim and desire to secure by Letters Patent is:

1. A device for removably mounting and connecting a reservoir or can adapted to contain liquids with a plurality of pipes or tubes, comprising, a fixed bracket, a connecting movable member therein and having a can engaging portion at one end and having fluid conducting passages therein, a tube connected with one passage and extending downward to the bottom of said reservoir and resilient means bearing on said connecting member within said bracket for holding said member in contact with the outlet of said can, one of said pipes being connectable with a source of pressure and the other of said pipes that is extended as a tube from one of said passages to a point adjacent the bottom of said can being connectable with a point of consumption of liquid from said can.

2. A device for supporting and connecting a reservoir or can, adapted to contain liquids, with a plurality of pipes or tubes, comprising a base for engaging and supporting the bottom of said can, a fixed bracket above said base, a movable member in said bracket engaging the outlet of said can and having passages therein, and resilient means carried by said bracket and bearing on said member, an eduction tube extending from one of the passages in said member downward to a point adjacent the bottom of said can, one of said pipes or tubes being adapted to be connected with a source of pressure and the other of said pipes that communicates with said eduction tube being adapted to be connected with a device for consuming said liquid.

3. A device for supporting and connecting a reservoir or can, adapted to contain a liquid to be used in another device, comprising a plurality of pipes or tubes, one of said pipes or tubes being connected with a suitable source of fluid pressure and the other of said pipes or tubes being connected with a point where said liquid is to be consumed, a supporting plate having a stop thereon for engaging and fixing the position of the bottom of said can, a member for engaging the outlet of said can, said member having passages therein one of which is connected with a downwardly extending eduction pipe, a projecting bracket carried by said plate and having a cylindrical portion at its outer end, a spring within said cylindrical portion which engages said member for holding the latter in resilient contact with said outlet, said pipes or tubes being adapted to cause the ejection of liquid from said can.

LEO B. KIMBALL.